US012586017B2

(12) United States Patent
Sethi et al.

(10) Patent No.: US 12,586,017 B2
(45) Date of Patent: Mar. 24, 2026

(54) AUTOMATED RESOURCE PRIORITIZATION USING ARTIFICIAL INTELLIGENCE TECHNIQUES

(71) Applicant: Dell Products L.P., Round Rock, TX (US)

(72) Inventors: Parminder Singh Sethi, Punjab (IN); Lakshmi Nalam, Bangalore (IN); Madhuri Dwarakanath, Bangalore (IN); Manish Gupta, Delhi (IN)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 18/107,303

(22) Filed: Feb. 8, 2023

(65) Prior Publication Data

US 2024/0264867 A1 Aug. 8, 2024

(51) Int. Cl.
G06Q 10/0631 (2023.01)

(52) U.S. Cl.
CPC .............................. G06Q 10/06315 (2013.01)

(58) Field of Classification Search
CPC ................................................ G06Q 10/06315
See application file for complete search history.

(56) References Cited

U.S. PATENT DOCUMENTS 6,684,193 B1 * 1/2004 Chavez .................. G06Q 10/04
705/7.25
10,216,544 B2 * 2/2019 Brech ..................... H04L 43/20

10,243,819 B1 * 3/2019 Chheda ................... H04L 41/22
10,692,101 B2 6/2020 Shariff et al.
10,733,015 B2 * 8/2020 Aronovich ............ G06F 9/4881
11,416,880 B2 8/2022 Shariff et al.
11,436,531 B2 * 9/2022 Li .......................... G06N 20/00
(Continued)

FOREIGN PATENT DOCUMENTS

JP H07105288 A * 4/1995 ............. G06F 17/00
WO WO-2015090379 A1 * 6/2015 ............... G06N 5/04

OTHER PUBLICATIONS

JP H07105288 English Translation (Year: 1995).*

*Primary Examiner* — Michael Jared Walker
(74) *Attorney, Agent, or Firm* — Ryan, Mason & Lewis, LLP

(57) ABSTRACT

Methods, apparatus, and processor-readable storage media for automated resource prioritization using artificial intelligence techniques are provided herein. An example computer-implemented method includes creating a resource demand pool associated with user requests pertaining to hardware resources; prioritizing demand of at least a portion of the hardware resources by processing, using artificial intelligence techniques, data associated with the hardware resources and data associated with the user requests; prioritizing supply of at least a portion of the hardware resources by processing, using the artificial intelligence techniques, data associated with the prioritized demand, data associated with existing supply of the at least a portion of the hardware resources, and historical data pertaining to user hardware resource returns; generating at least one prioritization representation associated with at least a portion of the hardware resources based on the prioritized demand and the prioritized supply; and performing automated actions based on the at least one prioritization representation.

20 Claims, 6 Drawing Sheets

400 CREATE AT LEAST ONE RESOURCE DEMAND POOL ASSOCIATED WITH MULTIPLE USER REQUESTS PERTAINING TO MULTIPLE HARDWARE RESOURCES

402 PRIORITIZE DEMAND OF AT LEAST A PORTION OF THE MULTIPLE HARDWARE RESOURCES WITHIN THE AT LEAST ONE RESOURCE DEMAND POOL BY PROCESSING, USING ONE OR MORE ARTIFICIAL INTELLIGENCE TECHNIQUES, DATA ASSOCIATED WITH THE MULTIPLE HARDWARE RESOURCES AND DATA ASSOCIATED WITH THE MULTIPLE USER REQUESTS

404 PRIORITIZE SUPPLY OF AT LEAST A PORTION OF THE MULTIPLE HARDWARE RESOURCES BY PROCESSING, USING THE ONE OR MORE ARTIFICIAL INTELLIGENCE TECHNIQUES, DATA ASSOCIATED WITH THE PRIORITIZED DEMAND, DATA ASSOCIATED WITH EXISTING SUPPLY OF THE AT LEAST A PORTION OF THE MULTIPLE HARDWARE RESOURCES, AND HISTORICAL DATA PERTAINING TO USER HARDWARE RESOURCE RETURNS

406 GENERATE AT LEAST ONE PRIORITIZATION REPRESENTATION ASSOCIATED WITH AT LEAST A PORTION OF THE MULTIPLE HARDWARE RESOURCES BASED AT LEAST IN PART ON THE PRIORITIZING OF THE DEMAND OF AT LEAST A PORTION OF THE MULTIPLE HARDWARE RESOURCES AND THE PRIORITIZING OF THE SUPPLY OF AT LEAST A PORTION OF THE MULTIPLE HARDWARE RESOURCES

408 PERFORM ONE OR MORE AUTOMATED ACTIONS BASED AT LEAST IN PART ON THE AT LEAST ONE PRIORITIZATION REPRESENTATION

(56)  References Cited

U.S. PATENT DOCUMENTS

| | | | |
|---|---|---|---|
| 12,159,257 B2 * | 12/2024 | Kumar | G06N 5/01 |
| 2019/0005435 A1 * | 1/2019 | Shukla | G06Q 10/103 |
| 2019/0319852 A1 * | 10/2019 | Casey | G06N 20/00 |
| 2020/0201647 A1 * | 6/2020 | Sharma | G06F 9/3856 |
| 2022/0004940 A1 * | 1/2022 | Sellers | G06F 11/3438 |
| 2022/0365770 A1 * | 11/2022 | Vrooman | G06F 3/0652 |
| 2022/0414564 A1 * | 12/2022 | Chiranewala | G06Q 30/0201 |
| 2023/0267323 A1 * | 8/2023 | Agarwal | G06Q 10/0637 |
| | | | 706/18 |

* cited by examiner

PRIORITIZATION MATRIX

300

| FACTORS | DEMAND RANK | DISPATCH TIME | REPAIR OF REPLACEMENT TIME | REGRESSION TEST TIME | USER WRITE-OFF HISTORY RATING | SUPPLY RANK |
|---------|-------------|---------------|----------------------------|----------------------|------------------------------|-------------|
| EXAMPLE 1 | 100 | 1 DAY | 3 DAYS | 2 DAYS | 1 | 345 |
| EXAMPLE 2 | 80 | 5 DAYS | 4 DAYS | 2 DAYS | 6 | 125 |
| EXAMPLE 3 | 95 | 5 DAYS | 3 DAYS | 3 DAYS | 9 | 50 |

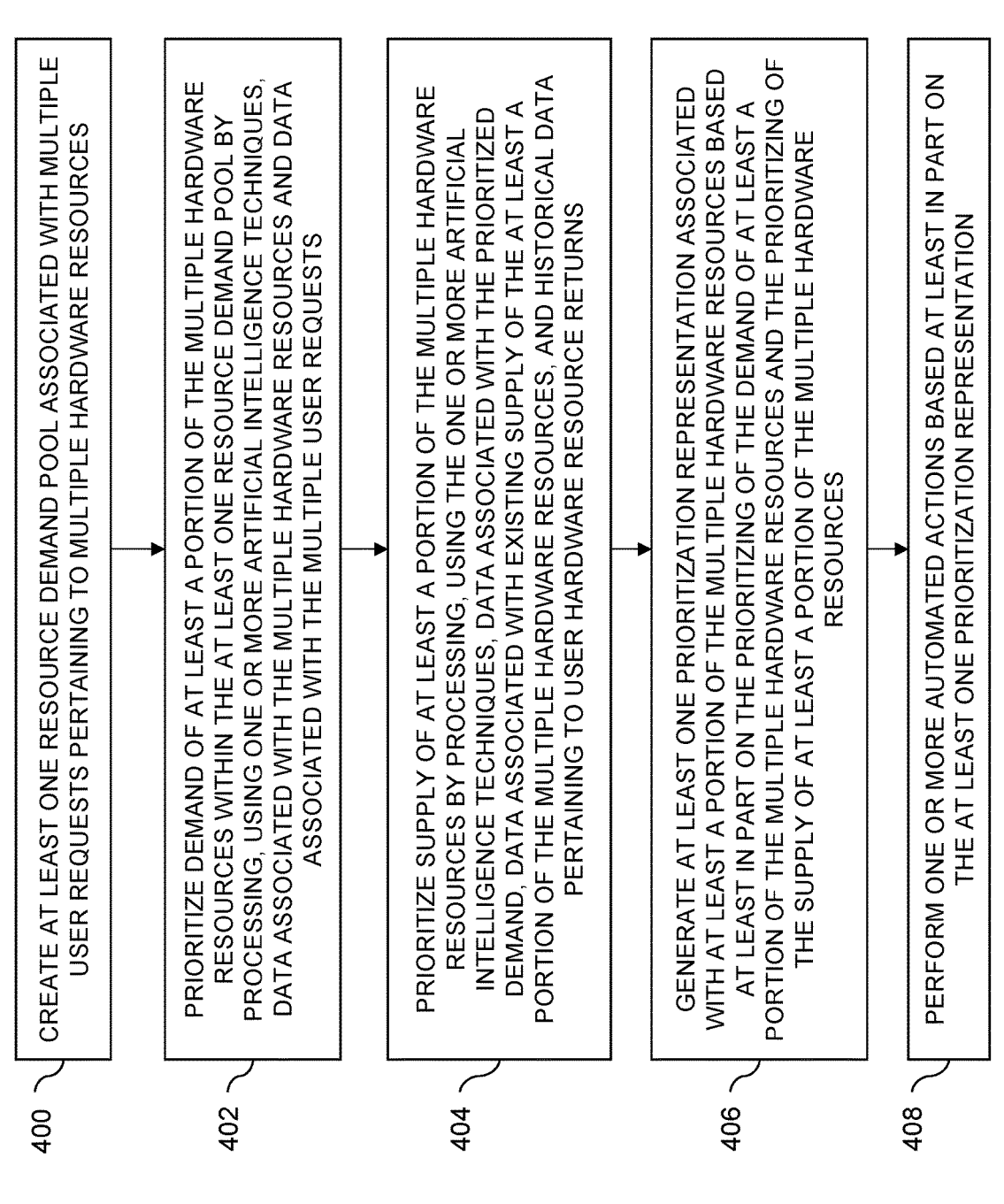

FIG. 4

400   CREATE AT LEAST ONE RESOURCE DEMAND POOL ASSOCIATED WITH MULTIPLE USER REQUESTS PERTAINING TO MULTIPLE HARDWARE RESOURCES

402   PRIORITIZE DEMAND OF AT LEAST A PORTION OF THE MULTIPLE HARDWARE RESOURCES WITHIN THE AT LEAST ONE RESOURCE DEMAND POOL BY PROCESSING, USING ONE OR MORE ARTIFICIAL INTELLIGENCE TECHNIQUES, DATA ASSOCIATED WITH THE MULTIPLE HARDWARE RESOURCES AND DATA ASSOCIATED WITH THE MULTIPLE USER REQUESTS

404   PRIORITIZE SUPPLY OF AT LEAST A PORTION OF THE MULTIPLE HARDWARE RESOURCES BY PROCESSING, USING THE ONE OR MORE ARTIFICIAL INTELLIGENCE TECHNIQUES, DATA ASSOCIATED WITH THE PRIORITIZED DEMAND, DATA ASSOCIATED WITH EXISTING SUPPLY OF THE AT LEAST A PORTION OF THE MULTIPLE HARDWARE RESOURCES, AND HISTORICAL DATA PERTAINING TO USER HARDWARE RESOURCE RETURNS

406   GENERATE AT LEAST ONE PRIORITIZATION REPRESENTATION ASSOCIATED WITH AT LEAST A PORTION OF THE MULTIPLE HARDWARE RESOURCES BASED AT LEAST IN PART ON THE PRIORITIZING OF THE DEMAND OF AT LEAST A PORTION OF THE MULTIPLE HARDWARE RESOURCES AND THE PRIORITIZING OF THE SUPPLY OF AT LEAST A PORTION OF THE MULTIPLE HARDWARE RESOURCES

408   PERFORM ONE OR MORE AUTOMATED ACTIONS BASED AT LEAST IN PART ON THE AT LEAST ONE PRIORITIZATION REPRESENTATION

AUTOMATED RESOURCE PRIORITIZATION USING ARTIFICIAL INTELLIGENCE TECHNIQUES

FIELD

The field relates generally to information processing systems, and more particularly to techniques for data processing in such systems.

BACKGROUND

In connection with the provisioning of hardware devices, many enterprises additionally provide services related thereto (e.g., warranty services, support services, etc.). Such services can include providing users with new and/or replacement components in response to user-reported issues. In such instances, it is typically expected that the original components are returned to the enterprise by the users. However, occasionally, users do not promptly return the original components, and in connection with conventional resource management approaches, labor-intensive methods are implemented by enterprises attempting to procure the original components, and/or enterprises write off the original components as losses.

SUMMARY

Illustrative embodiments of the disclosure provide techniques for automated resource prioritization using artificial intelligence techniques.

An exemplary computer-implemented method includes creating at least one resource demand pool associated with multiple user requests pertaining to multiple hardware resources, and prioritizing demand of at least a portion of the multiple hardware resources within the at least one resource demand pool by processing, using one or more artificial intelligence techniques, data associated with the multiple hardware resources and data associated with the multiple user requests. The method also includes prioritizing supply of at least a portion of the multiple hardware resources by processing, using the one or more artificial intelligence techniques, data associated with the prioritized demand, data associated with existing supply of the at least a portion of the multiple hardware resources, and historical data pertaining to user hardware resource returns. Further, the method additionally includes generating at least one prioritization representation associated with at least a portion of the multiple hardware resources based at least in part on the prioritizing of the demand of at least a portion of the multiple hardware resources and the prioritizing of the supply of at least a portion of the multiple hardware resources, and performing one or more automated actions based at least in part on the at least one prioritization representation.

Illustrative embodiments can provide significant advantages relative to conventional resource management approaches. For example, problems associated with labor-intensive and resource inefficient approaches are overcome in one or more embodiments through automatically prioritizing resource demand and corresponding resource supply using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 4 is a flow diagram of a process for automated resource prioritization using artificial intelligence techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
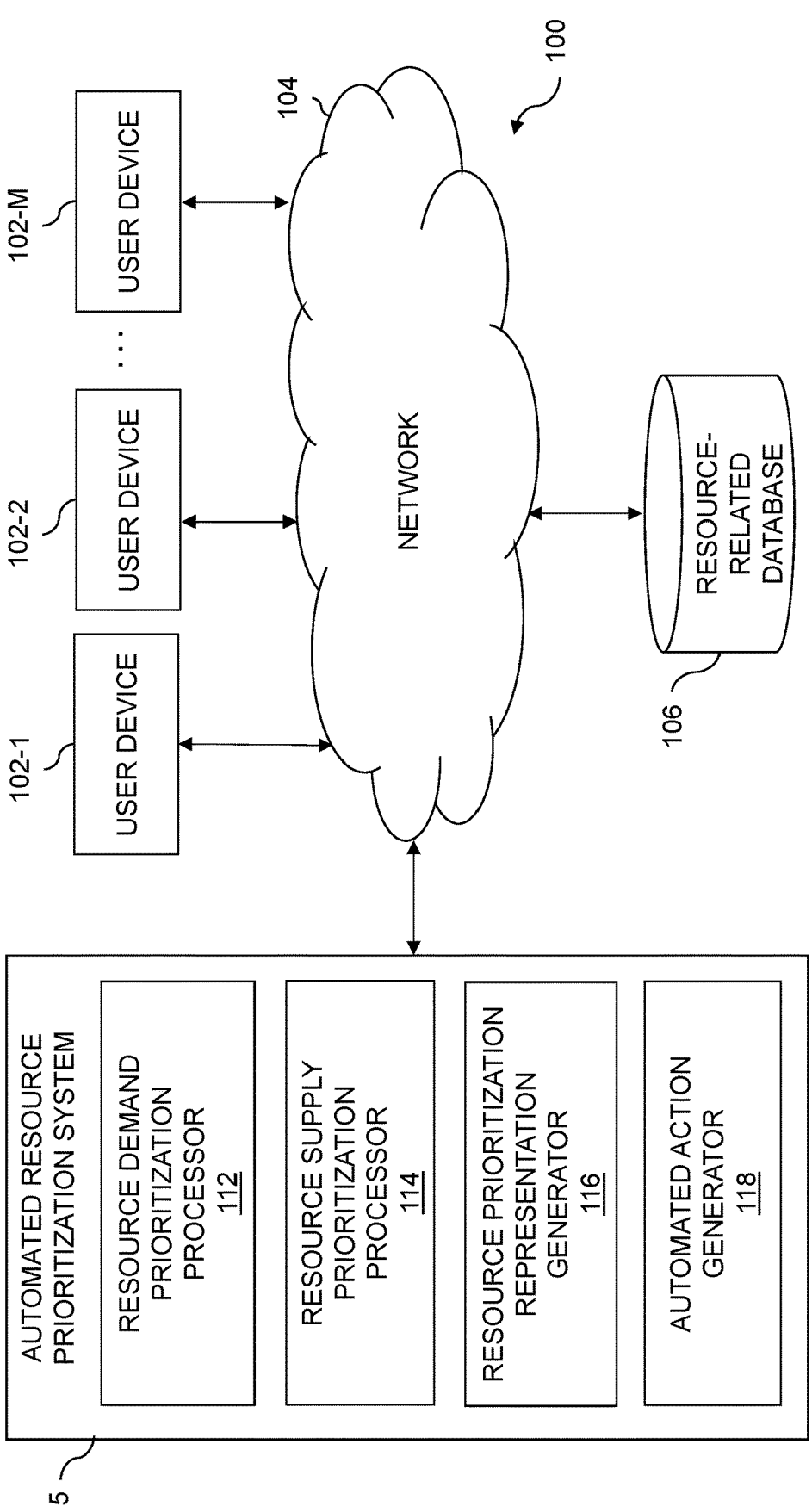
FIG. 1 shows an information processing system configured for automated resource prioritization using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated resource prioritization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated resource prioritization system 105 can have an associated resource-related database 106 configured to store data pertaining to resource demand data, resource supply data, resource-related user data (e.g., write-off data), resource-related temporal data, service level agreement data, etc.

The resource-related database 106 in the present embodiment is implemented using one or more storage systems associated with automated resource prioritization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated resource prioritization system 105 are one or more input-output devices, which illustratively comprise keyboards, displays or other types of input-output devices in any combination. Such input-output devices can be used, for example, to support one or more user interfaces to automated resource prioritization system 105, as well as to support communication between automated resource prioritization system 105 and other related systems and devices not explicitly shown.

Additionally, automated resource prioritization system 105 in the FIG. 1 embodiment is assumed to be implemented using at least one processing device. Each such processing device generally comprises at least one processor and an associated memory, and implements one or more functional modules for controlling certain features of automated resource prioritization system 105.

More particularly, automated resource prioritization system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated resource prioritization system 105 to communicate over the network 104 with the user devices 102, and illustratively comprises one or more conventional transceivers.

The automated resource prioritization system 105 further comprises resource demand prioritization processor 112, resource supply prioritization processor 114, resource prioritization representation generator 116, and automated action generator 118.

It is to be appreciated that this particular arrangement of elements 112, 114, 116 and 118 illustrated in the automated resource prioritization system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automated resource prioritization using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated resource prioritization system 105 and resource-related database 106 can be on and/or part of the same processing platform.

An exemplary process utilizing elements 112, 114, 116 and 118 of an example automated resource prioritization system 105 in computer network 100 will be described in more detail with reference to the flow diagram of FIG. 4.

Accordingly, at least one embodiment includes automated resource prioritization using artificial intelligence techniques. Such an embodiment includes generating and/or implementing a framework for prioritizing component supply and co-relating at least portions of such supply with demand-related data using at least one prioritization matrix and write-off data. For example, one or more embodiments include prioritizing component supply to meet the demand pertaining to replacement parts by processing demand-related data and creating at least one component supply pool. Also, at least one embodiment includes creating and implementing techniques for procuring components (e.g., components reported by users as damaged and/or defective) from users, wherein such techniques can bridge one or more gaps between replacement component supply and replacement component demand.

By way merely of illustration, consider a first example use case wherein a set of users must return defective components (e.g., personal computers, laptops, etc.) back to a given enterprise, and a second example use case wherein a set of users must receive at least one replacement component from the given enterprise. More specifically, consider UserA and UserB, two users who have purchased similar components and reported issues related thereto. Specifically, UserA has purchased a personal computer, and the personal computer has a hard-drive issue while every other component in the personal computer is functioning properly. Also, UserB has also purchased a personal computer, and the personal computer has a motherboard issue while every other component in the personal computer is functioning properly. Accordingly, one or more embodiments include attempting to reuse and/or re-purpose the properly functioning components from UserA's personal computer and UserB's personal computer in the event of return of the personal computers.

Such an embodiment can include processing data pertaining to resources (e.g., hardware and/or components thereof) that have returned by users and/or otherwise obtained from users, and identifying which resources and/or portions thereof (e.g., specific components) are functioning properly and are reusable. Based at least in part on such processing, one or more embodiments include creating at least one collection and/or pool of functioning and reusable resources for use in one or more automated actions (e.g., initiating one or more resource replacement operations using one or more resources from the collection and/or pool). Such an embodiment includes providing benefits related to prioritizing supply to meet replacement demand, reducing costs by promoting and/or facilitating the reuse of resources, and improving resource replacement and/or repair times, which in turn improves the user experience and/or user satisfaction.

As detailed herein, one or more embodiments include determining and prioritizing demand (e.g., resource replacement demand) by processing data pertaining to relevant resources. Such data can include, for example, model and configuration of resources (e.g., personal computers, laptops, etc.), the costs of the resources, dispatch time from the enterprise (e.g., at least one factory associated with the enterprise) to the user(s), and information pertaining to the time remaining to meet demand. In connection with the processing of such data, demand information can be prioritized based at least in part on one or more demand-related parameters. Further, based at least in part on the demand prioritization, one or more embodiments includes creating at least one supply pool of particular resources.

By way merely of example, with respect to demand prioritization, assume a use case wherein a user placed an order for a laptop through a sales team, and this order flows via an offline sales order tool. The order contains information such as the stock keeping unit (SKU) corresponding to each component configuration in the laptop, an offer and/or incentive used by the user, etc. Also, assume that the user placed this order from Location1, and as such, the nearest manufacturing factory associated with the enterprise is in Location2, where this laptop can be manufactured. Additionally, the service-level agreement (SLA) associated with this order requires delivery within 45 days from the order date. Further, the user requested one or more high-end configurations of one or more components, and as such, the cost of this laptop is more than a standard laptop. Accordingly, one or more embodiments include processing each of the above parameters related to the order to determine the demand rank to be associated with the order.

Such an embodiment includes creating at least one supply pool of resources by processing historical data pertaining to various resource variables. For example, as noted above, at least one embodiment includes processing one or more demand priorities determined as detailed above. Additionally, at least one embodiment includes identifying, from resources associated with user-reported issues that have not been returned to the enterprise (e.g., resources that can potentially be written-off by the enterprise), which portions of the resources (e.g., hardware and/or components thereof) are functioning and which portions of the resources can be replaced and/or reused.

In one or more embodiments, creating at least one supply pool further includes determining and/or calculating the time required to fetch resources from one or more particular users (e.g., users who have reported resource-related issues) to one or more enterprise facilities (e.g., an enterprise factory). Further, such an embodiment also includes determining and/or deducing the time required to repair and/or replace one or more portions of given resources by the enterprise and/or an associated entity. Also, as further detailed herein, creating at least one supply pool can additionally include performing one or more regression tests on resources at one or more enterprise facilities (e.g., resources returned by users to an enterprise factory) and analyze historical data pertaining to write-offs associated with given users in connection with implementing at least one prioritization matrix.

Figure 2:
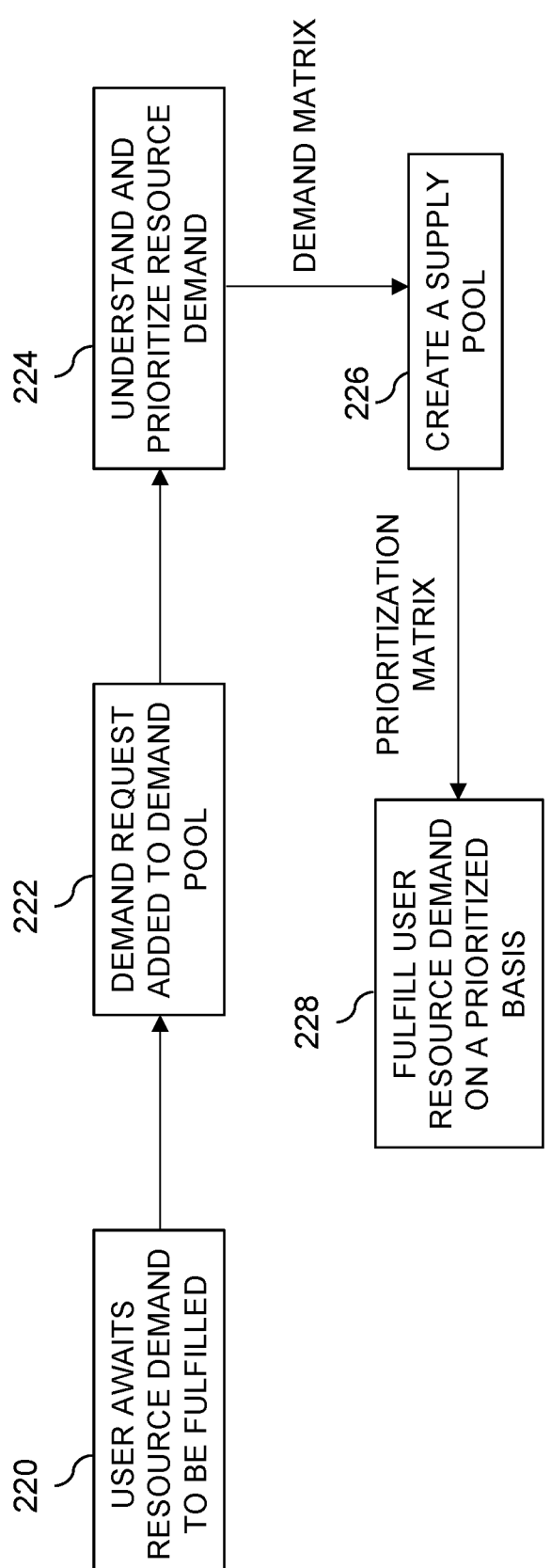
FIG. 2 shows an example workflow in accordance with an illustrative embodiment.

FIG. 2 shows an example workflow in accordance with an illustrative embodiment. By way of illustration, FIG. 2 depicts a user awaiting at least one resource demand to be fulfilled (e.g., by at least one given enterprise) in step 220. Step 222 includes adding the at least one demand to one or more demand pools, and step 224 includes understanding and prioritizing one or more portions of the at least one resource demand (e.g., relative to the other resource demands in at least one of the one or more demand pools). An output of step 224 includes at least one demand matrix, which is used to create at least one supply pool in step 226. An output of step 226 includes at least one prioritization matrix, which is used to fulfill at least a portion of the at least one user resource demand on a prioritized basis in step 228.

As detailed above and herein, one or more embodiments include understanding and prioritizing demand information. Accordingly, such an embodiment can include determining and/or identifying what resources are in demand (e.g., by processing data parameters fetched from sources including, for example, offline sales data, online sales data, replacement request data, etc.). Such a determination and/or identification can be based at least in part on offline sales data, online sales data, replacement request data, etc. Understanding and prioritizing demand information can also include determining configuration information associated with given resources, for example, using SKU information from user orders. One or more embodiments also include determining the time required to dispatch given resources from at least one enterprise location to at least one end destination (e.g., a user location). Such a determination can include processing historical data from at least one support database.

Additionally, understanding and prioritizing demand information can include determining how much time remains to meet one or more demand requirements based at least in part on service level agreement data. Such a determination can be made, for example, using information pertaining to order submission date information (e.g., derived from one or more sales order tools). One or more embodiments also include determining cost information associated with given resources. Such cost information can be based at least in part on configuration data associated with the given resources (e.g., determined using SKU information from user orders).

Also, using such demand information determinations and/or prioritizations, one or more embodiments include ranking given resources using at least one artificial intelligence technique such as, for example, at least one multiple linear regression technique. In such an embodiment, a multiple linear regression formula can include the following.

$$y_i = \beta_0 + \beta_1 x_{i1} + \beta_2 x_{i2} + \dots + \beta_p x_{ip} + \varepsilon$$

wherein y represents the target variable which denotes the rank of the resource, β refers to the intercept (e.g., the mean for the response when all of the explanatory variables take on the value zero), x refers to one or more independent variables (e.g., one or more parameters used to determine the rank), and ε refers to an error value.

As also detailed herein, one or more embodiments include creating at least one supply pool. In connection with such an embodiment, data pertaining to users who have not returned certain resources (e.g., resources that the corresponding users have identified as having one or more issues) to the given enterprise are utilized. Creating at least one supply pool can include determining supply information by processing at least one resource support-related database. Such determinations can include identifying which resources qualify for replacement using information such as at least one policy file. As used herein, a policy file is a file that contains alert information pertaining to resource-related issues, and a policy file can include parameters such as, for example, event identifier (ID), trap ID, and event source. Such parameters can determine alert types received from given resources.

By way merely of example, in the Simple Network Management Protocol (SNMP), an OID represents an "Object Identifier," wherein an OID includes an address used to uniquely identify managed devices and their statuses. Additionally, an OID also commonly contains an event ID and a trap ID.

Also, in one or more embodiments, such alert information can include information pertaining to technical support alerts and dispatch alerts. Technical support alerts pertain to one or more resource issues which can be remedied via one or more actions (e.g., by upgrading one or more drivers, software, firmware, etc.), and dispatch alerts pertain to resource-related failures which require dispatch of at least one replacement resource. As noted herein, in one or more embodiments, such a dispatch alert can be associated with a request to the corresponding user to return the failed resource to the enterprise. In one or more such instances, the resource can then be replaced or repaired by the enterprise, and subsequently sent back to the user (e.g., after satisfactory testing of the resource by the enterprise).

In connection with processing such alert information, at least one embodiment includes evaluating the amount of time required for a given resource (e.g., a failed resource) to reach the enterprise (e.g., an enterprise factory) from a user location. Such an embodiment can include processing historical data (e.g., historical shipping data, historical order data, support database information, etc.) to calculate how much time has been required for multiple relevant and/or related resources to reach a given enterprise location from one or more user locations. By way merely of example, assume that it is determined that it has historically taken approximately two days to transfer a personal computer from a user location region to a nearby enterprise factory. One or more embodiments can include using such a determination to deduce temporal determinations in connection with one or more other regions in conjunction with relevant historical data.

Additionally, at least one embodiment can include determining and/or deducing the time required to repair and/or replace given resources by the enterprise. Such determinations can be made, for example, by processing historical data pertaining to past repairs and/or replacements of similar and/or related resources. Such data can be fed into at least one artificial intelligence-based training model, which learns relevant temporal information and proposes one or more required mitigation steps using at least one regression tree. In at least one embodiment, a regression tree contains one or more issues and one or more mitigation steps related thereto, determined based on one or more factors. For example, a regression tree might contain the following: Component (A1), while facing a first issue (I1) with a given configuration (C1), is to be subjected to fix (F1). Such information is available in the regression tree to determine the mitigation steps for fix (F1) when a similar issue is again seen in connection with component (A1) and/or one or more other components.

Also, in one or more embodiments, after a given resource is repaired and/or replaced, at least one regression test is performed to test the resource or associated system. In making one or more of the above-noted temporal determinations, the time required to complete such a regression test can also considered.

After evaluating relevant demand rankings, dispatch times, repair and/or replacement times, and test durations, at least one embodiment can include identifying the number of resources available to meet the demand, and adding such resources (e.g., identifying information pertaining thereto) to at least one supply pool. In addition to such information, at least one embodiment also includes determining historical write-off-related data associated with given users. Such write-off-related data can be based at least in part on user behavior. By way merely of example, write-off-related data can include numerical values assigned to users based at least in part on the users' ability to and/or performance in returning resources to an enterprise. For instance, such a numerical value can range from one to ten, with one representing a user who promptly returns resources to an enterprise, and ten representing a user who has failed to return resources to an enterprise in a timely manner (or at all).

Using multiple linear regression techniques, and as further detailed herein, one or more embodiments can include determining at least one supply ranking and creating, based at least in part thereon, a prioritization matrix. By way of illustration, in an example prioritization matrix, the higher the supply ranking for a given resource and/or user, the better chances of the enterprise receiving the resource back from the user. Additionally, at least one embodiment includes using the prioritization matrix to initiate one or more automated actions such as, for example, communicating with particular users with respect to one or more resource returns (e.g., users who have to complete a return of a resource), using functioning components from returned resources to repair and/or replace components in other resources, testing repaired and/or replaced components or other resources, and shipping repaired resources and/or replacement resources to one or more users.

Figure 3:
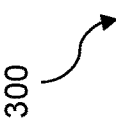
FIG. 3 shows an example prioritization matrix in an illustrative embodiment.

FIG. 3 shows an example prioritization matrix in an illustrative embodiment. By way of illustration, example prioritization matrix 300 includes columns detailing information pertaining to factors, demand rank, dispatch times, repair or replacement time, regression test time, user write-off history rating, and supply rank.

By way of illustration, when a user awaits fulfillment of a request to repair or replace a given resource, one or more embodiments include adding the request to a demand pool. Demand information is then analyzed and prioritized, and the rank of the resource associated with the request is determined using at least one statistical technique (e.g., multiple linear regression). Additionally, such an embodiment includes creating at least one supply pool by analyzing the supply, evaluating the time required for one or more related resources to reach at least one enterprise facility, and create at least one prioritization matrix based at least in part on such analysis and evaluations. Further, as detailed above, at least one embodiment includes using the at least one prioritization matrix to perform and/or initiate one or more automated actions related to the request and/or one or more related resources. By way merely of example, such an embodiment can include using the at least one prioritization matrix to follow-up on the return of one or more defective devices and/or components thereof from one or more users, to utilize one or more functioning components from otherwise faulty devices to replace one or more analogous components in other devices, etc.

Also, one or more embodiments include adding and/or incorporating user write-off-related data as an independent variable while in connection with determining supply rankings. In such an embodiment, user write-off-related data can influence supply prioritization. For example, if a user's write-off data indicates that the user does not return resources in a timely fashion, there is an increased likelihood that the enterprise will not receive the supply (i.e., the resource(s) in question) from the user in order to meet other demand.

Accordingly, in at least one embodiment, a supply ranking, in part, indicates which users require follow-up communications and/or actions in an effort to obtain resources (e.g., resources that the given users identified as defective and/or having one or more other issues, and for which the enterprise is awaiting return). Also, in such an embodiment, a supply ranking can be used in connection with prioritizing at least one queue (e.g., a supply queue, a demand queue, a user-related action queue, etc.).

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based at least in part on supply data, demand data and/or user write-off-related data, and such recommendations and/or predictions can be used to initiate one or more automated actions (e.g., actions related to initiating resource repairs and/or replacements, actions related to user communications, etc.).

FIG. 4 is a flow diagram of a process for automated resource prioritization using artificial intelligence techniques in an illustrative embodiment. It is to be understood that this particular process is only an example, and additional or alternative processes can be carried out in other embodiments.

In this embodiment, the process includes steps 400 through 408. These steps are assumed to be performed by the automated resource prioritization system 105 utilizing elements 112, 114, 116 and 118.

Step 400 includes creating at least one resource demand pool associated with multiple user requests pertaining to multiple hardware resources. In at least one embodiment, the multiple user requests pertaining to multiple hardware resources include at least one of one or more user hardware resource repair requests and one or more user hardware resource replacement requests.

Step 402 includes prioritizing demand of at least a portion of the multiple hardware resources within the at least one resource demand pool by processing, using one or more artificial intelligence techniques, data associated with the multiple hardware resources and data associated with the multiple user requests. In one or more embodiments, prioritizing demand of at least a portion of the multiple hardware resources within the at least one resource demand pool includes processing the data associated with the multiple hardware resources and the data associated with the multiple user requests using at least one multiple linear regression technique. Also, in at least one embodiment, prioritizing demand of at least a portion of the multiple hardware resources within the at least one resource demand pool can include generating at least one demand matrix.

Additionally or alternatively, prioritizing demand of at least a portion of the multiple hardware resources within the at least one resource demand pool can include predicting response times associated with at least a portion of the multiple user requests. Further, prioritizing demand of at least a portion of the multiple hardware resources within the at least one resource demand pool can include processing, using one or more artificial intelligence techniques, hardware resource configuration data, temporal data associated with at least a portion of the multiple user requests, service level agreement-related data associated with at least a portion of the multiple user requests.

Step 404 includes prioritizing supply of at least a portion of the multiple hardware resources by processing, using the one or more artificial intelligence techniques, data associated with the prioritized demand, data associated with existing supply of the at least a portion of the multiple hardware resources, and historical data pertaining to user hardware resource returns. In at least one embodiment, the historical data pertaining to user hardware resource returns include historical write-off data associated with each of one or more users related to at least a portion of the multiple user requests. Also, in one or more embodiments, prioritizing supply of at least a portion of the multiple hardware resources includes processing the data associated with the prioritized demand, the data associated with existing supply of the at least a portion of the multiple hardware resources, and the historical data pertaining to user hardware resource returns using at least one multiple linear regression technique.

Step 406 includes generating at least one prioritization representation associated with at least a portion of the multiple hardware resources based at least in part on the prioritizing of the demand of at least a portion of the multiple hardware resources and the prioritizing of the supply of at least a portion of the multiple hardware resources. In one or more embodiments, generating at least one prioritization representation includes generating at least one prioritization matrix associated with at least a portion of the multiple hardware resources.

Step 408 includes performing one or more automated actions based at least in part on the at least one prioritization representation. In at least one embodiment, performing one or more automated actions includes initiating one or more responses to at least a portion of the multiple user requests based at least in part on the at least one prioritization representation. Also, in one or more embodiments, performing one or more automated actions can include automatically training at least a portion of the one or more artificial intelligence techniques based at least in part on feedback related to the at least one prioritization representation. Additionally or alternatively, performing one or more automated actions can include generating and outputting at least one communication to at least one user associated with at least one of the multiple user requests, wherein the at least one communication pertains to a return of at least one hardware resource associated with the at least one of the multiple user requests.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically prioritize resources using artificial intelligence techniques. These and other embodiments can effectively overcome problems associated with labor-intensive and resource inefficient approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
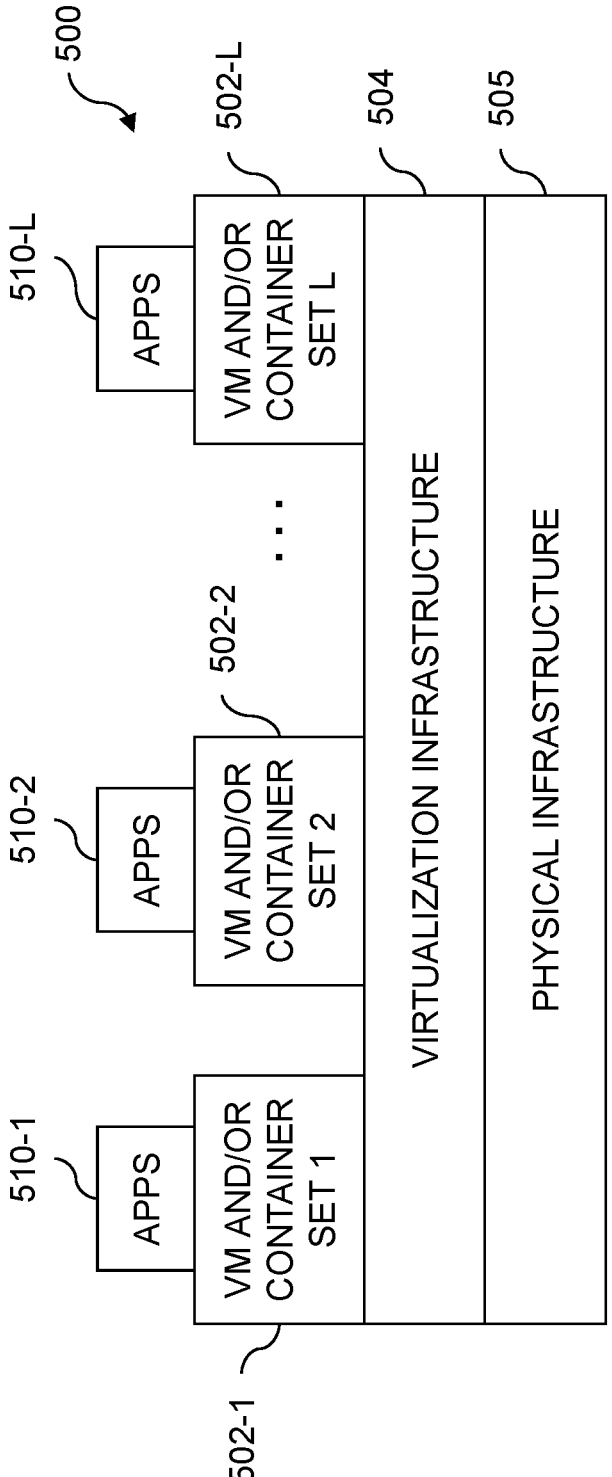
FIGS. 5 and 6 show examples of processing platforms that may be utilized to implement at least a portion of an information processing system in illustrative embodiments.
Figure 6:
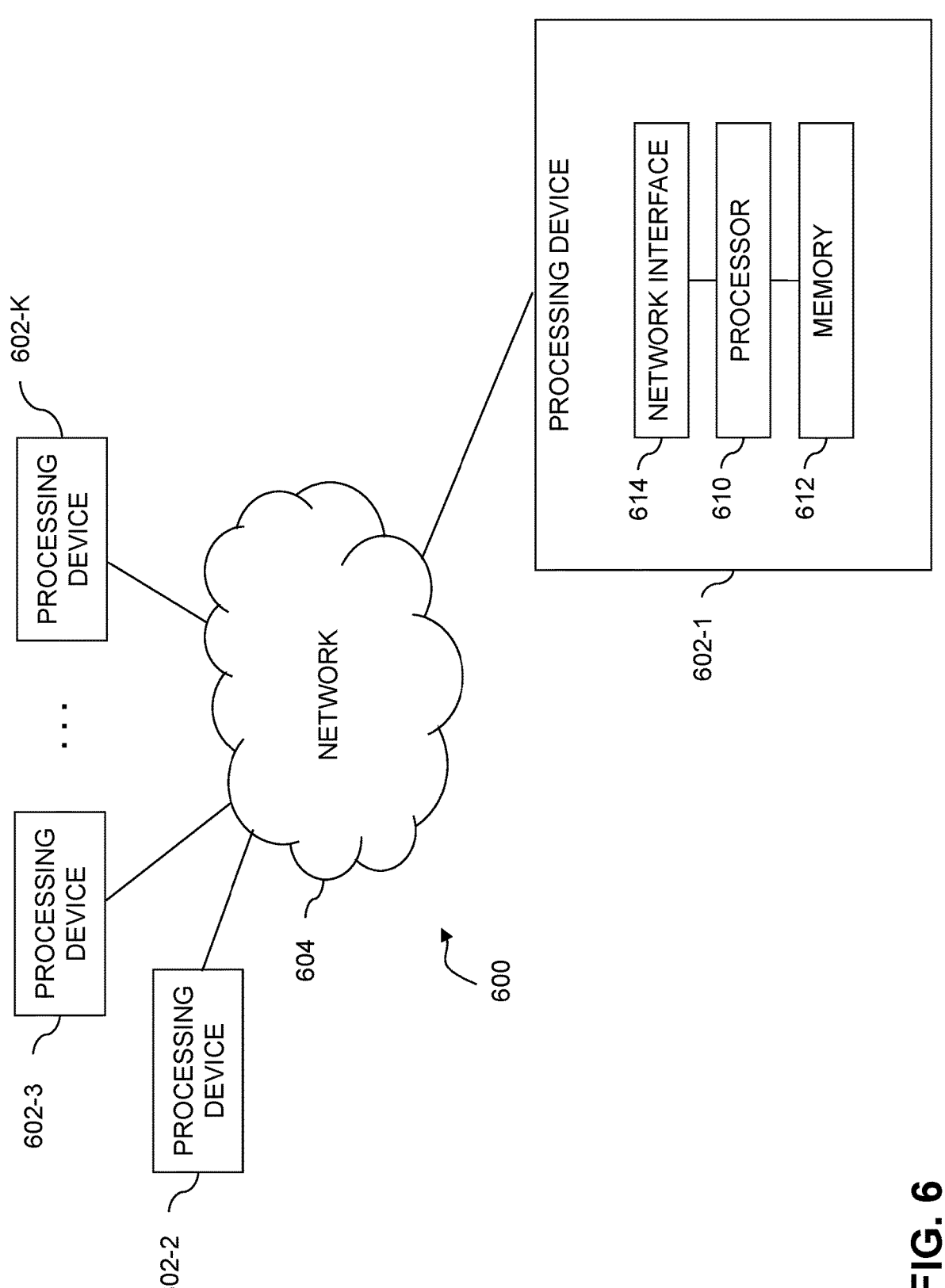

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

creating at least one resource demand pool associated with multiple user requests pertaining to multiple hardware resources;

prioritizing demand of at least a portion of the multiple hardware resources within the at least one resource demand pool by processing, using one or more artificial intelligence techniques, data associated with the multiple hardware resources and data associated with the multiple user requests;

prioritizing supply of at least a portion of the multiple hardware resources by processing, using the one or more artificial intelligence techniques, data associated with the prioritized demand, data associated with existing supply of the at least a portion of the multiple hardware resources, and historical data pertaining to user hardware resource returns;

generating at least one prioritization representation associated with at least a portion of the multiple hardware resources based at least in part on the prioritizing of the demand of at least a portion of the multiple hardware resources and the prioritizing of the supply of at least a portion of the multiple hardware resources; and performing one or more automated actions based at least in part on the at least one prioritization representation, wherein performing one or more automated actions comprises automatically initiating, in connection with at least one set of functioning components derived from returned instances of the at least a portion of the multiple hardware resources, at least one of one or more repair operations and one or more replacement operations for the at least a portion of the multiple hardware resources in accordance with the at least one prioritization representation;

wherein the method is performed by at least one processing device comprising a processor coupled to a memory.

2. The computer-implemented method of claim 1, wherein prioritizing demand of at least a portion of the multiple hardware resources within the at least one resource demand pool comprises processing the data associated with the multiple hardware resources and the data associated with the multiple user requests using at least one multiple linear regression technique.

3. The computer-implemented method of claim 1, wherein the historical data pertaining to user hardware resource returns comprise historical write-off data associated with each of one or more users related to at least a portion of the multiple user requests.

4. The computer-implemented method of claim 1, wherein performing one or more automated actions comprises initiating one or more responses to at least a portion of the multiple user requests based at least in part on the at least one prioritization representation.

5. The computer-implemented method of claim 1, wherein prioritizing supply of at least a portion of the multiple hardware resources comprises processing the data associated with the prioritized demand, the data associated with existing supply of the at least a portion of the multiple hardware resources, and the historical data pertaining to user hardware resource returns using at least one multiple linear regression technique.

6. The computer-implemented method of claim 1, wherein performing one or more automated actions comprises automatically training at least a portion of the one or more artificial intelligence techniques based at least in part on feedback related to the at least one prioritization representation.

7. The computer-implemented method of claim 1, wherein prioritizing demand of at least a portion of the multiple hardware resources within the at least one resource demand pool comprises generating at least one demand matrix.

8. The computer-implemented method of claim 1, wherein prioritizing demand of at least a portion of the multiple hardware resources within the at least one resource demand pool comprises predicting response times associated with at least a portion of the multiple user requests.

9. The computer-implemented method of claim 1, wherein prioritizing demand of at least a portion of the multiple hardware resources within the at least one resource demand pool comprises processing, using one or more artificial intelligence techniques, hardware resource configuration data, temporal data associated with at least a portion of the multiple user requests, service level agreement-related data associated with at least a portion of the multiple user requests.

10. The computer-implemented method of claim 1, wherein performing one or more automated actions comprises generating and outputting at least one communication to at least one user associated with at least one of the multiple user requests, wherein the at least one communication pertains to a return of at least one hardware resource associated with the at least one of the multiple user requests.

11. The computer-implemented method of claim 1, wherein generating at least one prioritization representation comprises generating at least one prioritization matrix associated with at least a portion of the multiple hardware resources.

12. The computer-implemented method of claim 1, wherein the multiple user requests pertaining to multiple hardware resources comprise at least one of one or more user hardware resource repair requests and one or more user hardware resource replacement requests.

13. A non-transitory processor-readable storage medium having stored therein program code of one or more software programs, wherein the program code when executed by at least one processing device causes the at least one processing device:

to create at least one resource demand pool associated with multiple user requests pertaining to multiple hardware resources;

to prioritize demand of at least a portion of the multiple hardware resources within the at least one resource demand pool by processing, using one or more artificial intelligence techniques, data associated with the multiple hardware resources and data associated with the multiple user requests;

to prioritize supply of at least a portion of the multiple hardware resources by processing, using the one or more artificial intelligence techniques, data associated with the prioritized demand, data associated with existing supply of the at least a portion of the multiple hardware resources, and historical data pertaining to user hardware resource returns;

to generate at least one prioritization representation associated with at least a portion of the multiple hardware resources based at least in part on the prioritizing of the demand of at least a portion of the multiple hardware resources and the prioritizing of the supply of at least a portion of the multiple hardware resources; and to perform one or more automated actions based at least in part on the at least one prioritization representation, wherein performing one or more automated actions comprises automatically initiating, in connection with at least one set of functioning components derived from returned instances of the at least a portion of the multiple hardware resources, at least one of one or more repair operations and one or more replacement operations for the at least a portion of the multiple hardware resources in accordance with the at least one prioritization representation.

14. The non-transitory processor-readable storage medium of claim 13, wherein prioritizing demand of at least a portion of the multiple hardware resources within the at least one resource demand pool comprises processing the data associated with the multiple hardware resources and the data associated with the multiple user requests using at least one multiple linear regression technique.

15. The non-transitory processor-readable storage medium of claim 13, wherein the historical data pertaining to user hardware resource returns comprise historical write-off data associated with each of one or more users related to at least a portion of the multiple user requests.

16. The non-transitory processor-readable storage medium of claim 13, wherein performing one or more automated actions comprises initiating one or more responses to at least a portion of the multiple user requests based at least in part on the at least one prioritization representation.

17. An apparatus comprising:

at least one processing device comprising a processor coupled to a memory;

the at least one processing device being configured:

to create at least one resource demand pool associated with multiple user requests pertaining to multiple hardware resources;

to prioritize demand of at least a portion of the multiple hardware resources within the at least one resource demand pool by processing, using one or more artificial intelligence techniques, data associated with the multiple hardware resources and data associated with the multiple user requests;

to prioritize supply of at least a portion of the multiple hardware resources by processing, using the one or more artificial intelligence techniques, data associated with the prioritized demand, data associated with existing supply of the at least a portion of the multiple hardware resources, and historical data pertaining to user hardware resource returns;

to generate at least one prioritization representation associated with at least a portion of the multiple hardware resources based at least in part on the prioritizing of the demand of at least a portion of the multiple hardware resources and the prioritizing of the supply of at least a portion of the multiple hardware resources; and to perform one or more automated actions based at least in part on the at least one prioritization representation, wherein performing one or more automated actions comprises automatically initiating, in connection with at least one set of functioning components derived from returned instances of the at least a portion of the multiple hardware resources, at least one of one or more repair operations and one or more replacement operations for the at least a portion of the multiple hardware resources in accordance with the at least one prioritization representation.

18. The apparatus of claim 17, wherein prioritizing demand of at least a portion of the multiple hardware resources within the at least one resource demand pool comprises processing the data associated with the multiple hardware resources and the data associated with the multiple user requests using at least one multiple linear regression technique.

19. The apparatus of claim 17, wherein the historical data pertaining to user hardware resource returns comprise historical write-off data associated with each of one or more users related to at least a portion of the multiple user requests.

20. The apparatus of claim 17, wherein performing one or more automated actions comprises initiating one or more responses to at least a portion of the multiple user requests based at least in part on the at least one prioritization representation.

* * * * *